(12) United States Patent
Ishizuka

(10) Patent No.: US 7,344,263 B2
(45) Date of Patent: Mar. 18, 2008

(54) OPTICAL ELEMENT AND PROCESSING METHOD FOR THE SAME

(75) Inventor: Keiichi Ishizuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 11/101,443

(22) Filed: Apr. 8, 2005

(65) Prior Publication Data

US 2005/0225887 A1 Oct. 13, 2005

(30) Foreign Application Priority Data

Apr. 13, 2004 (JP) ............................. 2004-118224
Mar. 11, 2005 (JP) ............................. 2005-069799
Mar. 11, 2005 (JP) ............................. 2005-069801

(51) Int. Cl.
*G02B 5/08* (2006.01)
(52) U.S. Cl. ..................................... 359/883
(58) Field of Classification Search ...................... None
See application file for complete search history.

(56) References Cited

U.S. PATENT DOCUMENTS 6,060,735 A * 5/2000 Izuha et al. ................. 257/295

2002/0015852 A1 * 2/2002 Noguchi et al. ............ 428/469

FOREIGN PATENT DOCUMENTS

| JP | 07-243027 | 9/1995 |
|----|-----------|--------|
| JP | 08-036222 | 2/1996 |
| JP | 08-168897 | 3/1996 |
| JP | 09-120705 | 5/1997 |
| JP | 2002-316226 | 10/2002 |

* cited by examiner

*Primary Examiner*—Euncha P. Cherry
(74) *Attorney, Agent, or Firm*—Fitzpatrick Cella Harper & Scinto

(57) ABSTRACT

Forming an optical element curved surface mirror with a low surface roughness and high shape precision at a low cost by only forming without employing any one of various types of polishing operations during a manufacturing process. The present invention provides an optical element processing method of forming an optical element by forming a metal base material with a die, and includes a film formation step of forming a metal film on a surface of the metal base material by PVD, CVD, plating, or dipping, and a forming step of forming the metal base material, having the metal film formed on its surface, with the die.

18 Claims, 13 Drawing Sheets

F I G. 1
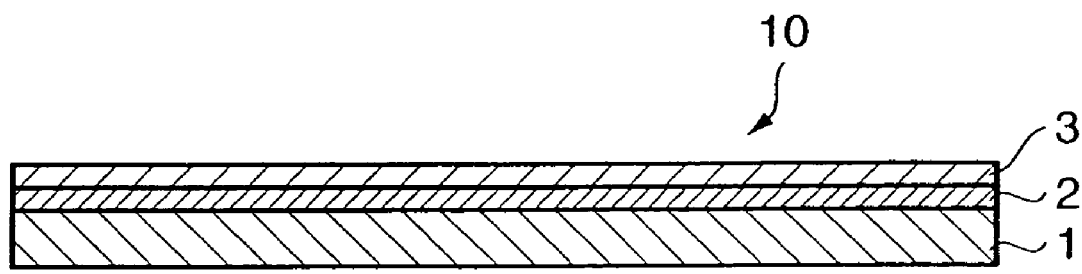

FIG. 6

| MAJOR MATERIAL WHICH CONSTITUTES SURFACE | COMMERCIALLY AVAILABLE BASE MATERIAL | TEMPERING OF BASE MATERIAL (JIS STANDARD) | SURFACE ROUGHNESS (Ra) OF BASE MATERIAL (μm) | MAXIMUM LENGTH OF FOREIGN SUBSTANCE (μm) | PROCESS | FORMING TEMPERATURE (K) | DIE SURFACE ROUGHNESS (Ra) (nm) | DIE SURFACE PRECISION (PV) (μm) | USE OF LUBRICATING MATERIAL | SURFACE ROUGHNESS (Ra) OF FORMED PRODUCT (nm) | SURFACE PRECISION (PV) OF FORMED PRODUCT (μm) | ACCEPTABILITY OF SURFACE DEFECT | COST PERFORMANCE | APPLICABILITY AS OPTICAL ELEMENT |
|---|---|---|---|---|---|---|---|---|---|---|---|---|---|---|
| EXAMPLE 1 | 99.99% Al | 99.0% Al | 0 | 0.9 | 4 | PLATE → DEPOSITION → FORMING | 353 | 3 | 0.5 | NOT USED | 4 | 1.1 | ◯ | ◯ | ◯ |
| EXAMPLE 2 | 99.5% Al | 98.0% Al | H22 | 1.6 | 7 | PLATE → DEPOSITION → FORMING | 403 | 4 | 1.1 | NOT USED | 7 | 2.6 | ◯ | ◯ | ◯ |
| EXAMPLE 3 | 99.95% Cu | 99.0% Cu | 0 | 0.5 | 3 | PLATE → DEPOSITION → FORMING | 503 | 5 | 2.3 | NOT USED | 7 | 4.1 | ◯ | ◯ | ◯ |

FIG. 7

| | COMMER-CIALLY AVAIL-ABLE BASE MATE-RIAL | TEM-PERING OF BASE MATE-RIAL | SURFACE ROUGH-NESS (Ra) OF BASE MATE-RIAL | MAXI-MUM LENGTH OF FOREIGN SUB-STANCE | PROC-ESS | FORM-ING TEMPER-ATURE | DIE SUR-FACE ROUGH-NESS (Ra) | DIE SUR-FACE PRECI-SION (PV) | USE OF LUBRI-CATING MATE-RIAL | SURFACE ROUGH-NESS (Ra) OF FORMED PROD-UCT | SURFACE PRECI-SION (PV) OF FORMED PROD-UCT | ACCEPT-ABILITY OF SUR-FACE DEFECT | COST PERFOR-MANCE | APPLI-CABILITY AS OPTICAL ELEMENT |
|---|---|---|---|---|---|---|---|---|---|---|---|---|---|---|
| | | JIS STAN-DARD | μm | μm | | K | nm | μm | | nm | μm | | | |
| COMPAR-ATIVE EXAMPLE 1 | 99.0% Al | O | 1.3 | 4 | PLATE → FORM-ING | 353 | 3 | 0.5 | NOT USED | 26 | 0.7 | × | ○ | × |
| COMPAR-ATIVE EXAMPLE 2 | 98.0% Al | H22 | 2.1 | 7 | PLATE → FORM-ING | 403 | 4 | 1.1 | NOT USED | 53 | 3.5 | × | ○ | × |
| COMPAR-ATIVE EXAMPLE 3 | 99.85% Al | H18 | 0.08 | 3 | PLATE → FORM-ING | 353 | 4 | 1.1 | NOT USED | 11 | 6.5 | × | ○ | × |
| COMPAR-ATIVE EXAMPLE 4 | 99.0% Al | H18 | 0.8 | 4 | PLATE → 4NAL DEPO-SITION → FORM-ING | 353 | 3 | 0.5 | USED | 4 | 5.8 | × | ○ | ○ |
| COMPAR-ATIVE EXAMPLE 5 | 99.0% Cu | O | 0.5 | 5 | PLATE → FORM-ING | 503 | 5 | 2.4 | NOT USED | 35 | 4.3 | × | ○ | × |

OPTICAL ELEMENT AND PROCESSING METHOD FOR THE SAME

FIELD OF THE INVENTION

The present invention relates to a technique for manufacturing a reflecting optical element by press-forming a metal plate.

BACKGROUND OF THE INVENTION

Conventionally, image systems, which uses a reflecting optical elements, such as a flight simulator, head-mounted display, projector, and the like, are known. Among these systems, particularly as a proposal of a reflecting optical element material mainly containing a metal material or a reflecting optical element, a reflecting material in which an Al (aluminum) base metal is continuously deposited on the surface of an Al rolled material, as disclosed in Japanese Patent Laid-Open No. 7-243027, is known. Also, a method of manufacturing a curved surface mirror by processing, particularly a stainless steel plate material, which is mirror-surface polished, in accordance with press forming or bulge forming, as disclosed in Japanese Patent Laid-Open No. 8-36222, is known. In addition, a method of obtaining an illuminating mirror by subjecting Al, an Al alloy, or stainless steel to drawing or dieless forming to have a curved surface and thereafter processing the curved surface by various types of polishing operations, as disclosed in Japanese Patent Laid-Open No. 9-120705, is known.

A conventional metal optical element material has crystal anisotropy parallel to the rolling direction of the material, and its mechanical characteristics differ between the rolling direction of the material and a cross direction to the rolling direction. Because the material is compressed in the direction of plate thickness, the hardness of the material surface is very high. Therefore, when a formed product such as a concave mirror is to be manufactured by pressing, as the transcribing performance of the press die differs between the rolling direction and the direction perpendicular to the rolling direction, it is difficult to obtain high shape precision. Also, as the hardness of the material surface is high, it is difficult to sufficiently transcribe the smoothness of the surface of the press die to the surface of the press formed product.

For these reasons, in most metal reflecting optical elements, as seen in above patent references 1 to 3, polishing and mirror-surface processing are performed to ensure the shape precision and surface roughness, however, this results in long processing times.

A material which focuses only on the surface roughness has also been developed. In the reflecting material disclosed in patent reference 1, which is obtained by continuously depositing the Al base metal on the surface of the Al rolled material, the crystal grain size decreases to improve the surface smoothness. When the crystal grain size is decreased, the surface roughness of the material itself decreases to improve the reflectance. In the depositing step, however, if deposition is performed to decrease the crystal grain size, the deposition layer is hardened due to the Hall-Petch effect. Then, in the press step, the smoothness of the surface of the press die cannot be sufficiently transcribed to the surface of the press formed product, and surface cracks tend to easily occur, making it difficult to form a free-form surface which is smooth and has a small curvature radius.

According to another method, a commercially available expensive optical aluminum material is used. Japanese Patent Laid-Open No. 2002-316226 discloses a method of imparting gloss to a laminate of high-purity aluminum and low-purity aluminum by roller burnishing, and embossing the laminate with a superhigh stress, thus obtaining a metal optical element having a diameter of about 1 mm to 2 mm. With this method, as the material is originally smooth and a high load can be applied to a very small area of the material, a yield strength which is equal to or more than work-hardening of the material can be achieved. However, as the hardness of the material surface is high, the smoothness of the die cannot be sufficiently transcribed, and the resulting surface roughness is as high as 10 nm or more. In addition, in this aluminum optical element, since the original material has strong anisotropy, if the demanded precision of the optical element is to be satisfied, only a small formed product having a diameter of 2 mm or less can be obtained.

SUMMARY OF THE INVENTION

The present invention has been made in view of the problems described above, and has as its object to be able to easily obtain high shape precision and high surface smoothness when an optical element is to be formed by pressing a metal plate.

In order to solve the above problems and achieve the above object, according to the first aspect of the present invention, there is provided an optical element processing method of forming an optical element by press forming a metal base material with a die, comprising a film formation step of forming a metal film on a surface of the metal base material, and a press forming step of forming the metal base material, having the metal film formed on the surface thereof, with the die.

According to the second aspect of the present invention, there is provided an optical element being formed by the processing method described above and having a surface with a surface roughness Ra that satisfies $Ra \leq 10$ nm and a shape precision PV that satisfies $PV \leq 5$ μm with respect to a shape of the die.

According to the third aspect of the present invention, there is provided an optical element comprising a base material formed of a metal plate material, and a metal film which is formed on the base material and made of a metal material, wherein within a depth range of 2 nm to 60 nm from a surface of the metal film, average Young's modulus E and average hardness Hv of the metal film of respective depths satisfy $65 \text{ GPa} \leq E \leq 130 \text{ GPa}$ and $1.5 \text{ GPa} \leq Hv \leq 15 \text{ GPa}$, respectively.

According to the fourth aspect of the present invention, there is provided a reflecting optical element comprising a base material formed of a metal plate material, and a metal film which is formed on the base material and made of a metal having a poly-crystal structure, wherein an average value θa in an optical effective surface of the reflecting optical element of an angle θ formed by a normal to a surface of a crystal that appears on a surface of the metal film and a normal to a position where the crystal is present on a surface of an ideal mirror surface as a target shape of the reflecting optical element satisfies $0° \leq \theta a \leq 45°$.

According to the fifth aspect of the present invention, there is provided a method of manufacturing a reflecting optical element by press-forming a metal plate, comprising a preparation step of preparing a base material which is formed of a metal plate material having substantially no mechanical anisotropy, a metal film formation step of depositing a metal having a poly-crystal structure on the base material to form a metal film in room temperature, and a forming step of press-forming the base material, on which the metal film has been formed, by using a die to form a reflecting optical element.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a cross-sectional view showing a state wherein a high-purity metal film is formed on one surface of a base material which is used to manufacture a curved surface mirror;

FIG. 6 is a table showing the press forming results of the examples of the first embodiment;

FIG. 7 is a table showing the press forming results of the comparative examples of the first embodiment;

DETAILED DESCRIPTION OF THE PREFERRED EMBODIMENTS

The preferred embodiments of the present invention will be described with reference to the accompanying drawings.

First Embodiment

FIG. 1 is a cross-sectional view showing a state wherein a high-purity metal film 3 is formed on one surface of a plate material 10, i.e., a base material 1, serving as a material to manufacture a curved surface mirror. An undercoat 2 is formed on the surface of the base material 1 to increase the adhesion strength between the base material 1 and high-purity metal film 3.

Figure 2:
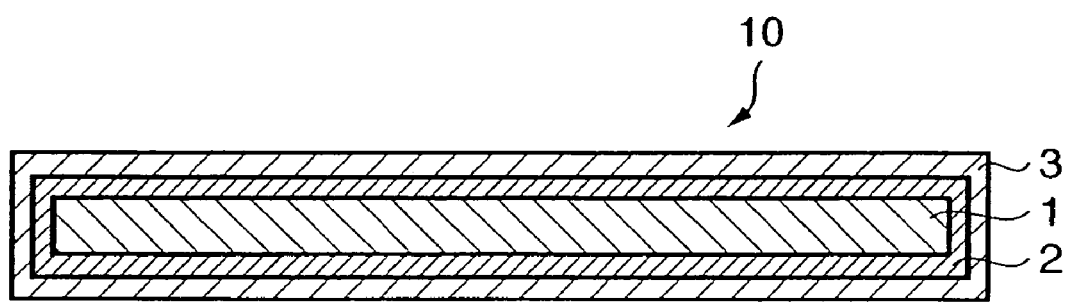
FIG. 2 is a cross-sectional view showing a state wherein a high-purity metal film is formed on each of the two surfaces of a base material in the same manner as in FIG. 1.

FIG. 2 is a cross-sectional view showing a state wherein a high-purity metal film 3 is formed on each of the two surfaces of a base material 1 in the same manner as in FIG. 1.

Figure 3:
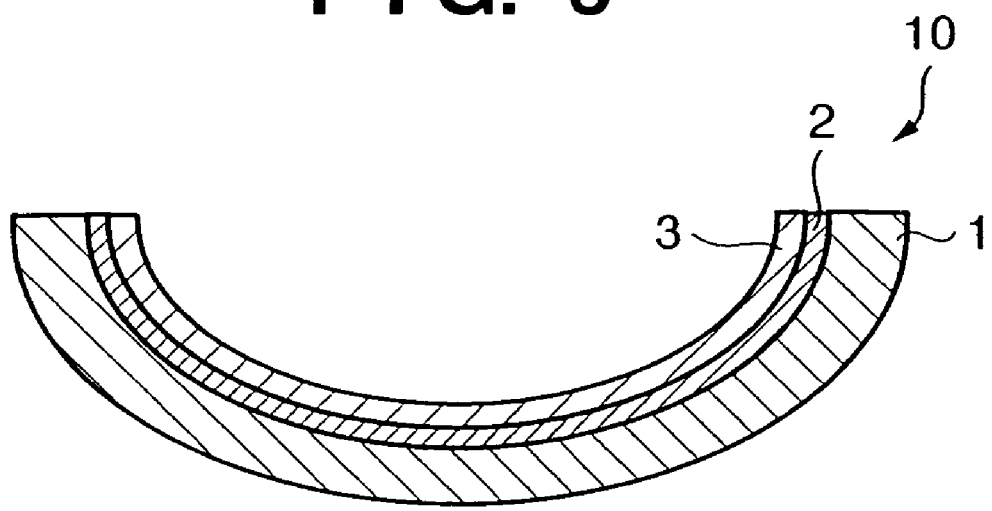
FIG. 3 is a cross-sectional view of a finished formed product which is manufactured by forming the plate material shown in FIG. 1 with a die.

FIG. 3 is a cross-sectional view of a finished formed product which is manufactured by forming the plate material 10 shown in FIG. 1 with a die.

Figure 4:
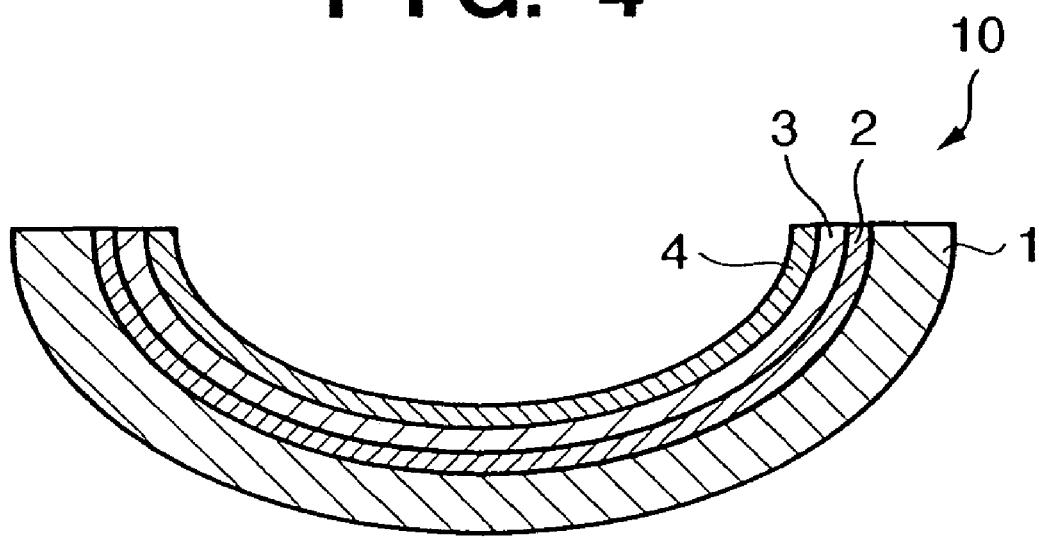
FIG. 4 is a cross-sectional view showing a state wherein a reflecting film, a protective film, or a laminated film of a reflecting film and protective film is formed on the optical surface of the finished forming product shown in FIG. 3.

FIG. 4 is a cross-sectional view showing a state wherein a reflecting film, a protective film, or a laminated film 4 of a reflecting film and protective film is formed on the optical surface of the finished press formed product shown in FIG. 3.

Figure 5:
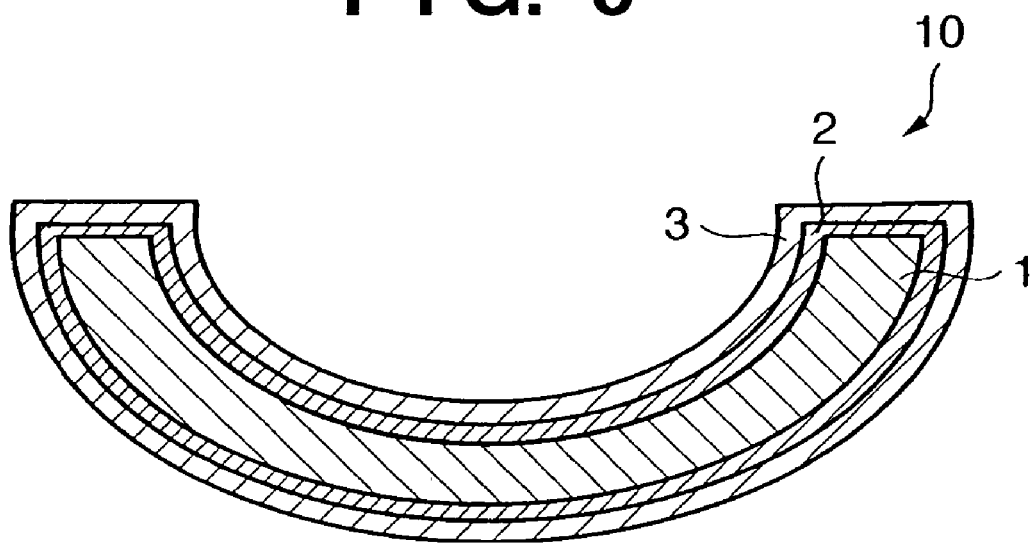
FIG. 5 is a cross-sectional view of a finished formed product which is manufactured by forming the plate material shown in FIG. 2 with a die.

FIG. 5 is a cross-sectional view of a finished formed product which is manufactured by forming a plate material 10 shown in FIG. 2 with a die.

Prior to a detailed explanation of the first embodiment of the present invention, a general mirror surface forming method will be described.

Generally, as a metal strengthening method, solid solution strengthening, aging strengthening, dispersion strengthening, and the like are known. Among these, in aging strengthening and dispersion strengthening, precipitation which is heterogeneous from the parent phase and dispersed chemical compounds serve as large obstacles against movement of dislocation to increase the strength. Such a highly strengthened material can be easily imparted with gloss by mechanical polishing, laminated polishing, or the like, and is manufactured from an aluminum alloy or stainless steel and widely used to form an illuminating or optical reflecting plate.

When the precipitated phase, segregation, dispersed material, mixed material, or the like is not coherent with the parent phase, or is not partly coherent with it, according to the above processing method, the precipitated phase, segregation, or dispersed materials may drop from the surface of the body material or serve as a crack start point, or may produce height difference due to a wear difference with respect to the body material, thus forming a defect in the surface of the optical element body material. Depending on the scale or depth of the defect, the highly strengthened material cannot meet demands as a high-quality optical element.

In order to improve these drawbacks, a purity-increased rolled plate or a plywood laminate obtained by adhering high-purity plates may be planarized by skin-pass rolling or the like. The material or base material of such a rolled plate or plywood laminate has strong anisotropy, and an after-forming target shape precision for a particularly large size cannot be obtained at all. Also, a sufficiently high flatness cannot be obtained by mere precision rolling.

In view of this, according to the first embodiment of the present invention, first, the metal film 3 is formed on the rolled plate (base material 1). As a result, with the cover of the metal film 3, the precipitated phase, segregation, or dispersion strengthening component on the surface of the base material 1 can be eliminated as much as possible, and surface defects that may be resulted decrease.

When Young's modulus of the base material at the forming temperature is smaller than that of the surface-forming metal, the load mainly serves as a deforming stress to improve the shape precision and contributes less to an improvement in surface roughness. Obviously, it is difficult to obtain a target quality. Therefore, the Young's modulus of the base material 1 during forming is set larger than that of the uppermost-surface film material (metal film 3).

Before forming the metal film 3 on the base material 1, the base material 1 is subjected to appropriate annealing in advance. It is found that by annealing, recovery or recrystallization occurs in the base material 1 to improve the anisotropy of the base material 1 itself, so that the shape precision of a larger-size formed product is improved greatly. Furthermore, when the film (metal film 3) is highly purified, the malleability/rollability of the film increases, and the die transcribing performance to the metal surface with a comparatively low stress is greatly improved. As the film texture of the metal film 3 is different from the aggregational texture of the base material 1, anisotropy on the uppermost surface is improved. Hence, according to this embodiment, the content of components other than the major film component of the metal film 3 is set to 1 mol % or less. It is also confirmed that the use amount of the expensive high-purity material is very small and that a very smooth curved surface mirror can be manufactured at a low cost.

In the manufacture of a general metal mirror, to obtain a mirror surface, tool steel which is polished to form a so-called mirror surface is used. A lubricating liquid, resin sheet, or the like is inserted between the tool and the metal material so that the formed product will not be damaged, and then forming is performed. In this case, both the demanded shape precision and surface roughness cannot be obtained.

According to this embodiment, press forming is performed by using a curved surface die which adopts, as a die material, tool steel, a carbide alloy, cermet, a ceramic material, an amorphous alloy, an intermetallic compound, a heat-resistant, corrosion-resistant chromium alloy, a nickel alloy, an iron alloy, or the like, so that the surface roughness (Ra) of the surface (forming surface) of the die becomes 10 nm or less. The forming surface of the die material is covered by a metal oxide, metal carbide, metal nitride, high-density carbon, a noble-metal base film, or a laminate film having a combination of these materials, and the surface roughness (Ra) of the cover surface is set to 10 nm or less. Then, press forming can be performed to meet the demanded surface roughness without adopting the respective types of lubricating materials at least on the optical effective surface of the metal plate (the base material 1 and metal film 3 that are assembled together). As a method of further improving slip of the material during forming, ultrasonic vibration or an impact pressure may be applied to the die material.

As a commercially available metal base material that can be adopted as the base material 1 of the optical element (mirror), one having a surface roughness Ra satisfying Ra≦3 μm is used. A general mirror surface is known to have a surface roughness (Ra) falling within the range of 0.05 μm to 0.1 μm, and the initial plate surface of an illuminating device material is surface-treated within this range. Conventionally, two methods are available, i.e., a method of subjecting the material in advance to planarization (mirror-surface treatment) mechanically or chemically and thereafter forming the planarized material to form a metal mirror, and a method of forming a commercially available material and thereafter subjecting the formed material to planarization (mirror-surface) treatment mechanically or chemically to obtain a metal mirror. According to the prior art, planarization (mirror-surface) treatment (polishing treatment or the like) is performed anyway. Therefore, the process tact is prolonged and the product cost increases. Neither of the obtained metal mirrors is for the manufacture of a high-quality optical element in the first place.

In contrast to this, according to this embodiment, it is confirmed that after the high-purity film (metal film 3) is actually formed on the commercially available metal plate (base material 1), the resultant structure is press-formed under appropriate press conditions. Thus, fine steps on the surface of the material can be compressed and deformed and the surface roughness Ra can be easily suppressed to 10 nm or less within a short period of time.

According to this embodiment, foreign substances larger than 50 μm, which cause a surface defect and are inevitably mixed due to the process, are eliminated as much as possible. Hence, a formed product that satisfies the same quality demand as that described above can be obtained. Regarding the foreign substances which are inevitably mixed due to the process, those having a size of 50 μm or more can be decreased as much as possible if the product material is manufactured in, e.g., a highly clean environment.

In the practical forming process, conventionally, various types of polishing operations typically represented by mechanical polishing are performed after forming to obtain a surface roughness (Ra) of about 2.8 nm in the case of a polycrystal metal (Japanese Patent Laid-Open No. 8-68897). With this polishing process, polishing after forming takes a long period of time and is performed by a batch scheme, thus increasing the cost.

In view of this, according to this embodiment, the material (the base material 1 and metal film 3 assembled together) and the fine steps on the material surface are deformed by one press forming operation at once, or slowly and continuously, so that both the demanded shape precision and surface roughness can be obtained simultaneously. When forming is repeated a plurality of times, a certain degree of shape precision can be imparted by initial forming, and the target high shape precision and low surface roughness can be imparted by last press forming. Also, the high-purity film (metal film 3) is formed while repeating forming a plurality of times to impart a certain degree of shape precision by initial forming. The target high shape precision and low surface roughness can be imparted by last press forming.

When the embodiment descried above is performed without using a lubricant or the like at least on the optical effective surface, the die transcribing performance to the uppermost surface of the product is improved, and defects such as cracks or voids which occur from a non-coherent foreign substance or nonuniform structure decrease considerably, or just decrease, or are hardly seen. Regarding the quality of the obtained large-size product, the surface roughness Ra satisfies Ra≦10 nm and the shape precision PV of the optical effective surface satisfies PV≦5 μm with respect to the shape of the die. Low surface roughness and high shape precision can be obtained simultaneously without performing any one of various types of polishing processes. In this manner, a large-size metal curved surface formed product for an optical element, which has a very smooth surface exceeding anticipation, is obtained. After a reflecting film, protective film 4, or the like is formed on the supersmooth metal curved surface formed product, the high shape precision and low surface roughness described above can be maintained.

When a hollow structure is formed by arranging formed products each formed in the above manner, or formed products, each having a surface on which a high reflection film, a protective film, or a laminated film 4 as a combination of the high reflection film and protective film is formed, to oppose each other so that they reflect each other, a compact optical device can be provided.

From this point of view, optimal conditions with which a high-quality optical element can be obtained at a low cost are studied intensively. FIGS. 6 and 7 show examples and comparative examples of the optimal conditions.

Regarding the surface roughness of this embodiment, roughness data (Ra) which is obtained with an arbitrary area of about 300 μm square by using New View 100 as a non-contact optical interference measurement device is indicated. As the shape data of this embodiment, the shape precision (PV) of the entire optical effective surface which is obtained by using Zygo Mark 4 as a non-contact optical interference measurement device is indicated.

As a method of forming the surface of an inexpensive, commercially available annealed rolled plate (base material 1) with a high-purity metal material (metal film 3) easily at a low cost, according to this embodiment, deposition is employed. Deposition is performed at a substrate temperature of 100° C. or less. When the substrate temperature exceeds 100° C., the film hardness increases, and the surface becomes rough after forming. Also, the film texture grows to enhance the surface roughness. In order to improve the adhesion strength between the high-purity film (metal film 3) and the base material 1, it is also preferable to form the undercoat 2 which improves the adhesion strength. The present invention is not limited to deposition, but other film forming conditions and other film forming methods such as PVD, CVD, plating, or dipping may be employed.

When a laminated curved surface mirror material for an optical mirror, the surface of which is formed of the high-purity metal film (metal film 3), is to be formed, none of various types of polishing operations is performed at all. A curved surface die having a surface roughness Ra satisfying Ra≦10 nm is used at a forming temperature equal to or less than a recrystallization temperature in an atmosphere, vacuum, or inert environment. The clean degree around the die is increased particularly high. The laminated material (the base material 1 and metal film 3 that are assembled together), which is prepared as described above, is subjected to press forming once or a plurality of times while controlling the forming load and forming speed such that the product surface roughness Ra satisfies Ra≦10 nm and the shape precision PV of the optical effective surface satisfies PV≦5 μm with respect to the shape of the die. The above embodiment is merely an example and does not limit the present invention. To change the optical element plate material, materials to form the plate material, a manufacturing method, and a formed product by considering the purpose described above is included within the scope of the present invention.

As described above, according to the above embodiment, defects larger than 50 μm, which appear on the surface of the optical element curved surface mirror after forming, can be greatly decreased without performing any one of various types of polishing operations at all during the entire process.

A very smooth surface can be obtained without using any expensive optical element curved surface mirror material, by only performing forming in accordance with plastic deformation with a die having a very high precision. The resultant surface can be employed as a high-quality large-size optical element curved surface mirror. The number of steps after forming can be decreased greatly to decrease the cost.

As a result, an optical element curved surface mirror which has a sufficiently high shape precision and surface roughness as an optical element, and an optical device formed of such a curved surface mirror which is hollow can be provided at a low cost.

Second Embodiment

The second embodiment of the present invention will be described.

The sectional structure of a plate material 10 as a forming material of this embodiment is similar to that of the first embodiment shown in FIGS. 1 to 5.

First, to transcribe the smoothness of a die which is made very smooth on the nanometer level onto a forming material (plate material 10), at least the surface layer of the plate material 10 serving as the forming material must have a high purity, and each of an initial surface layer (a high-purity metal film 3) and a base material 1 must have a low dislocation density and isotropic structure. Unlike in the base material 1, the formed film need not have a spherical texture.

Generally, between a shearing deformation stress τ and average dislocation density ρ, a relation of $\tau = \tau_0 + \alpha \mu b \sqrt{\rho}$ (where τ0 and α: constants; μ: modulus of rigidity; and b: Burgers vector) is established. When ρ is large, deformation is interfered with.

More specifically, the characteristic feature of a reflecting optical element according to the second embodiment is as follows. The forming material (plate material 10) before forming, which has Young's modulus E of 60 GPa to 72 GPa and a hardness Hv of 1.2 GPa to 7.7 GPa in its surface layer within the range of 2 nm to 60 nm in the depthwise direction of its section, is press-formed under the following film forming conditions and forming conditions. Namely, after the forming, the dislocation density of the element surface increases, and the forming material is work-hardened such that its Young's modulus E and hardness Hv in its surface layer within the range of 2 nm to 60 nm in the depthwise direction of its section respectively increase to 65 GPa to 130 GPa and 1.5 GPa to 15 GPa. Regarding the base material 1, if it is annealed in advance to have a yield strength of 15 N m$^2$ or more as regulated by the JIS standard, the dislocation density is decreased. Also, if the base material 1 has an isotropically orientated structure, a highly precise shape can be obtained.

The uppermost surface layer is formed of the high-purity metal film 3, as described above. Regarding the temperature for this formation (deposition), if the maximum temperature is 130° C. as in Japanese Patent Laid-Open No. 7-243027, a target reflecting optical element cannot be obtained. Preferably, the maximum temperature is between 80° C. (inclusive) and room temperature (inclusive). When deposition is performed at a low temperature in this manner, the deposited high-purity metal film 3 before forming is comparatively soft just like snow lying on the ground which has not been beaten yet. For this reason, slip, rotation, or the like tends to occur in the crystal structure of the high-purity metal film 3. The high-purity metal film 3 can easily deform to conform to the smooth surface of the die, so that the smoothness on the surface of the die is transcribed very well. When a film formed under this temperature condition is formed, the surface of the die can be transcribed easily on the nanometer order.

The high-purity aluminum film which is formed at a temperature within the range of room temperature to 80° C. has perpendicular columnar crystals on its surface. The present inventor has found that, when observing microscopically, the columnar crystals desirably include fine crystals of 50 nm or more in a direction perpendicular to the film surface. As a result, because the columnar crystals are fine, they not only contribute to the smoothness of the surface, but also prevent considerable organized orientation. The high surface energy on the surface of the grain boundary serves as a driving force which moderates work-hardening on the steps of the uppermost surface by dynamic recrystallization during compression forming, so that smoothening can be promoted.

The high-purity metal film 3 preferably has a texture (e.g., aluminum) having a crystal structure including face-centered cubic lattices which have many slip surfaces and high deformability. As the base material 1, a non-rolled plate material is desirably used. Alternatively, if a rolled plate material is to be used, its mechanical anisotropy is desirably removed in advance by annealing.

When the forming material (plate material 10) which satisfies the above conditions is formed, it has not only high surface smoothness but also excellent shape formability. Therefore, by forming, a reflecting surface having any shape can be obtained as a target.

As the formed surface is a high-purity, high-smoothness aluminum surface, it has a spectroreflectance that exceeds a maximum of 90% in the visible range. Hence, an anti-corrosion film can be formed on the product surface directly. Also, a film structure which is specifically preferable for use in an infrared range or a film structure having a higher reflectance in the visible range can be formed by making the most of the characteristic feature of a high-smoothness surface.

The die smoothness and shape can be transcribed very well to a formed product which is formed under the above conditions. In other words, whether the die is good or not influences the quality of the formed product. Although depending on the die technique, considering the current die technique, desirably, the surface roughness Ra of the forming surface of the die satisfies Ra≦10 nm and the waving height PV of the optical effective surface satisfies PV≦5 µm.

According to this embodiment, if the shape of the formed product is simple, an optical element can be obtained by one forming press forming operation without using any polishing process before or after forming. If the formed product has a large size or complicated shape, after a plurality of number of times of compression rough forming is performed, precision forming may be formed last. Alternatively, a film may be formed after a plurality of number of times of compression rough forming, and final precision forming may be performed immediately after the film formation.

Optimal conditions with which a high-quality optical element can be obtained at a low cost are studied intensively from these viewpoints. Examples and comparative examples of the optimal conditions are described hereinafter.

The Young's modulus E and hardness Hv in the vicinity of the surface of the reflecting optical element of this embodiment are based on the average values which are obtained in the following manner. More specifically, after the formed element is cut by an FIV, the cut piece is fixed to a support, and its flat surface is searched by a nano-indentation (Triboscope manufactured by Hystron) having an interatomic force microscope. By using an indenter Cube Corner made of diamond, Young's modulus E and hardness Hv are measured starting from the uppermost film surface (including an oxide film) inward at N=3 times with a maximum load of 10 mN, an indentation depth of about 50 nm, and a measurement pitch of about 5 nm. The average values of Young's modulus E and hardness Hv at each depth are obtained. Regarding the macroscopic surface roughness, roughness data (Ra) which is obtained by measuring an arbitrary area of about 300 µm square by using New View 100 as a non-contact optical interference measurement device is indicated. As the shape data of this embodiment, the shape precision (PV) of the entire optical effective surface which is measured by using Zygo Mark 4 as a non-contact optical interference measurement device is indicated.

Regarding the columnar crystal texture of the surface of the reflecting optical element material, according to an inexpensive manufacturing method, a high-purity metal material is deposited on the surface of a commercially available annealed rolled plate by PVD, CVD, or the like at a temperature of 80° C. or less. Then, a large-area material can be obtained at once. Film formation may be performed with a size according to the need, or on a near-net-shape formed product (primary formed product). In this manner, the above scheme does not limit the present invention. Various changes can be made in the optical element plate material, materials to form the plate material, and a manufacturing method without departing from the spirit and scope of the present invention.

When an optical reflecting element material (plate material 10) formed with the above method is to be formed, none of various types of polishing operations is performed at all as a preprocess. The material is formed by only forming press forming with a die having a forming surface with a surface roughness Ra that satisfies Ra≦10 nm at a forming temperature equal to or less than a recrystallization temperature in an atmosphere, vacuum, or inert environment, without using any lubricant at all. The forming load and forming speed are controlled so that the surface roughness Ra of the reflecting optical element satisfies Ra≦10 nm and the shape precision PV of the optical effective surface satisfies PV≦5 µm with respect to the shape of the die. This embodiment is merely an example, and the optical element plate material, materials to form the plate material, a manufacturing method, and a formed product can be changed without departing from the scope of the present invention.

EXAMPLE 1

Figure 8A:
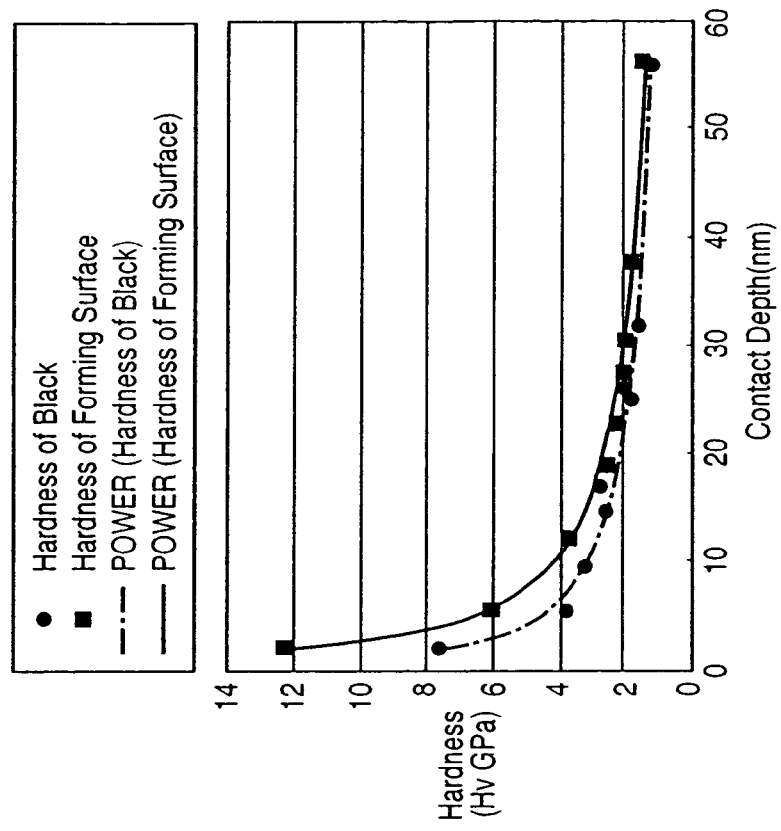
FIGS. 8A and 8B are graphs showing the measurement values of the Young's modulus and hardness of a high-purity metal film before and after forging in Example 1 of the second embodiment.
Figure 8B:
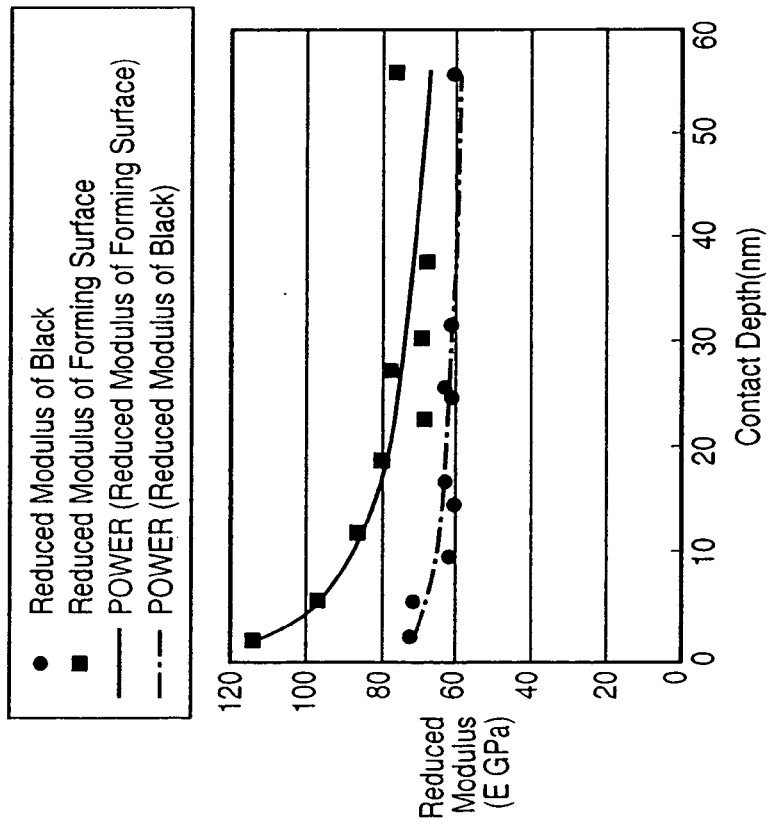

A columnar crystal texture (high-purity metal film 3) having a film thickness of 2 µm was formed on the surface of a commercially available annealed pure aluminum material, which complied with the JIS standard and was not particularly subjected to any gloss process such as skin-pass drawing, in an environment of $2 \times 10^{-5}$ Torr at room temperature by using aluminum having a purity of 99.99 mol %. At a depth of 2 nm from the surface of the high-purity metal film 3, Young's modulus E was 72.3 GPa and the hardness Hv was 7.7 GPa. This material (plate material 10) had been subjected to none of various types of polishing operations as a forming preprocess. Forming was performed using a spherical die having a surface roughness Ra of 5 nm at a forming temperature equal to or less than the recrystallization temperature of a pure aluminum film in an atmosphere. The material plate was formed by only press forming without using any lubricant at all to form a reflecting optical element. According to the measurement results at the same position (at a depth of 2 nm from the surface of the high-purity metal film 3), Young's modulus E was 114.4 GPa, the hardness Hv was 12.5 GPa, the surface roughness Ra was 6 nm, and the shape precision PV of the optical effective surface was 1.1 µm with respect to the die shape. An oxide film formed on the surface of the high-purity metal film 3 was 5-nm thick by TEM observation. An $SiO_2$ protective film was formed on the obtained formed product to improve the infrared-range reflecting characteristics and durability. FIGS. 8A and 8B show the measured values of the Young's modulus and hardness of the high-purity metal film 3 before and after forming.

EXAMPLE 2

A material plate made of a commercially available annealed pure copper material, which complied with the JIS standard and was not particularly subjected to any gloss process such as skin-pass drawing, was press-formed in an atmosphere by using a spherical die having a surface roughness. Ra satisfying Ra≦100 nm to obtain a primary formed product. A columnar crystal texture having a film thickness of 3 μm was formed on the surface of the formed product in an environment of $2 \times 10^{-5}$ Torr at a temperature of 76° C. by using aluminum having a purity of 99.99 mol %. At a depth of 2 nm from the surface of the material (high-purity metal film 3), Young's modulus E was 65 GPa and the hardness Hv was 6.5 GPa. This primary formed product had been subjected to none of various types of polishing operations as a forming preprocess. The primary formed product was formed at a forming temperature equal to or less than the recrystallization temperature of a pure aluminum film (high-purity metal film 3) in an inert environment by using a curved surface die having a surface roughness Ra of 5 nm by only final press forming without using any lubricant at all, thus forming a reflecting optical element. According to the measurement results at the same position (at a depth of 2 nm from the surface of the high-purity metal film 3), Young's modulus E was 119 GPa, hardness Hv was 13.2 GPa, the surface roughness Ra was 7 nm, and the shape precision PV of the optical effective surface was 4.3 μm with respect to the die shape. An oxide film formed on the surface of the high-purity metal film 3 was 5-nm thick by TEM observation. An $SiO_2$ protective film was formed on the obtained formed product to improve the infrared-range reflecting characteristics and durability.

EXAMPLE 3

A columnar crystal texture (high-purity metal film 3) having a film thickness of 3 μm was formed on the surface of a commercially available annealed pure aluminum material, which complied with the JIS standard and was not particularly subjected to any gloss process such as skin-pass drawing, in an environment of $2 \times 10^{-5}$ Torr at a temperature of 50° C. by using aluminum having a purity of 99.9 mol %. At a depth of 2 nm from the surface of the high-purity metal film 3, Young's modulus E was 79 GPa and the hardness Hv was 9.7 GPa. This material (plate material 10) had been subjected to none of various types of polishing operations as a forming preprocess. The material plate was press-formed in an atmosphere by using a free-form surface die having a surface roughness Ra satisfying Ra≦50 nm without using any lubricant at all to obtain a primary formed product. The primary formed product was not subjected to any preprocess at all, and formed at a temperature equal to or less than the recrystallization temperature of the pure aluminum film (high-purity metal film 3) of the primary formed product in an atmosphere by using a curved surface die having a surface roughness Ra of 3 nm by only final press forming without using any lubricant at all, thus forming a reflecting optical element. According to the measurement results at the same position (at a depth of 2 nm from the surface of the high-purity metal film 3), Young's modulus E was 128 GPa, hardness Hv was 14.1 GPa, the surface roughness Ra was 5 nm, and the shape precision PV of the optical effective surface was 3.4 μm with respect to the die shape. An oxide film was 3-nm thick by TEM observation. Films are formed on the obtained formed product in the order of $SiO_2/TiO_2/SiO_2$ to improve the visible-range reflecting characteristics and durability.

COMPARATIVE EXAMPLE 1

Ninety-nine % high-purity aluminum and 95% or less aluminum or aluminum alloy were subjected to hot rolling to form a plywood laminate, and the plywood laminate was further subjected to a gloss process by skin-pass drawing. At a depth of 2 nm from the upper surface of high-purity aluminum, Young's modulus E was 133 GPa and the hardness Hv was 15.2 GPa. This material had been subjected to none of various types of polishing operations as a forming preprocess. This plywood laminate was formed at a forming temperature equal to or less than the recrystallization temperature in an atmosphere by using a curved surface die having a surface roughness Ra of 5 nm by only press forming without using any lubricant at all. According to the measurement results at the same position, Young's modulus E was 136 GPa and the hardness Hv was 15.8 GPa. The surface roughness Ra of this reflecting optical element was 12 nm, and the shape precision PV of the optical effective surface was 10 μm with respect to the die shape, exhibiting a large distortion. Thus, a high-precision reflecting optical element could not be obtained.

COMPARATIVE EXAMPLE 2

A granular crystal texture having a film thickness of 2 μm was formed on the surface of a commercially available annealed pure aluminum material, which complied with the JIS standard and was not subjected to any gloss process such as skin-pass drawing, in an environment of $2 \times 10^{-5}$ Torr at a temperature of 84(C by using aluminum having a purity of 99.99 mol %. At a depth of 2 nm from the surface of the high-purity metal film 3, Young's modulus E was 125 GPa and the hardness Hv was 8 GPa. This material had been subjected to none of the various types of polishing operations as a forming preprocess. Forming was performed using a curved surface die having a surface roughness Ra of 3 nm at a forming temperature equal to or less than the recrystallization temperature in an inert environment. The material plate was formed by only press forming without using any lubricant at all. According to the measurement results at the same position, Young's modulus E was 135 GPa and the hardness Hv was 15.4 GPa. Cracks formed on the deposited aluminum film, and an optical element could not be obtained.

As described above, according to the second embodiment described above, after forming, high-smoothness, high-precision reflecting optical element can be obtained without performing any one of various types of polishing operations at all and without using any lubricant. More specifically, when compared to a conventional reflecting mirror which is made of an expensive high-reflecting aluminum material and subjected to mirror-surface polishing before and after forming, the number of processing steps after forming can be greatly decreased, and the cost can be decreased. As a result, an optical element curved surface mirror which has a shape precision and surface roughness that are sufficiently high as an optical element, and an optical device which uses a plurality of curved surface mirrors each obtained in this manner can be obtained at a low cost.

According to the first and second embodiments described above, a curved surface mirror for a large-size optical element, which has a low surface roughness and high size precision can be manufactured at a low cost by only forming without employing any of various types of polishing operations at all during the manufacturing process.

Third Embodiment

The third embodiment of the present invention will be described with reference to the accompanying drawings.

Figure 9:
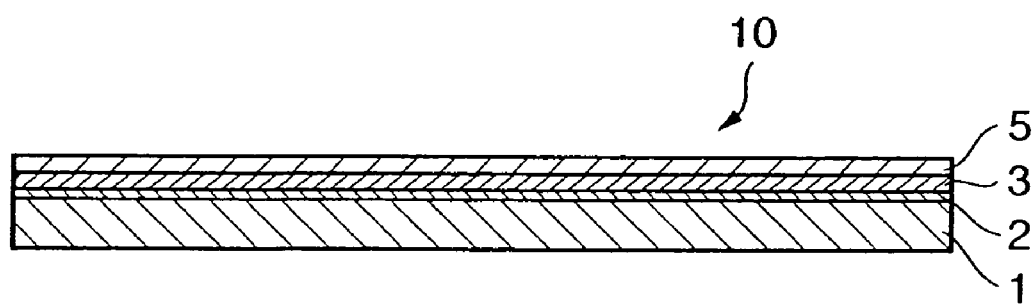
FIG. 9 is a cross-sectional view showing a plate material serving as a material to manufacture a curved surface mirror.

FIG. 9 is a sectional view showing a plate material 10 serving as a material to manufacture a curved surface mirror. The plate material 10 is obtained by forming a high-purity metal film 3 on one surface of a metal base material 1 by deposition. An undercoat 2 is formed on the surface of the base material 1 to increase the adhesion strength between the base material 1 and high-purity metal film 3. An oxide film 5 which is oxidized by oxygen in the ambient environment during the deposition process is formed on the surface of the high-purity metal film 3. An example of the ambient environment during deposition of the high-purity metal film 3 includes air, an inert gas, a vacuum, and the like. Not only air but also an inert gas, vacuum, or the like contains a small amount of oxygen that oxidizes the surface of the high-purity metal film 3, and accordingly the oxide film 5 is inevitably formed although its thickness may vary. The oxide film 5 is in an amorphous state and not crystallized.

Figure 10:
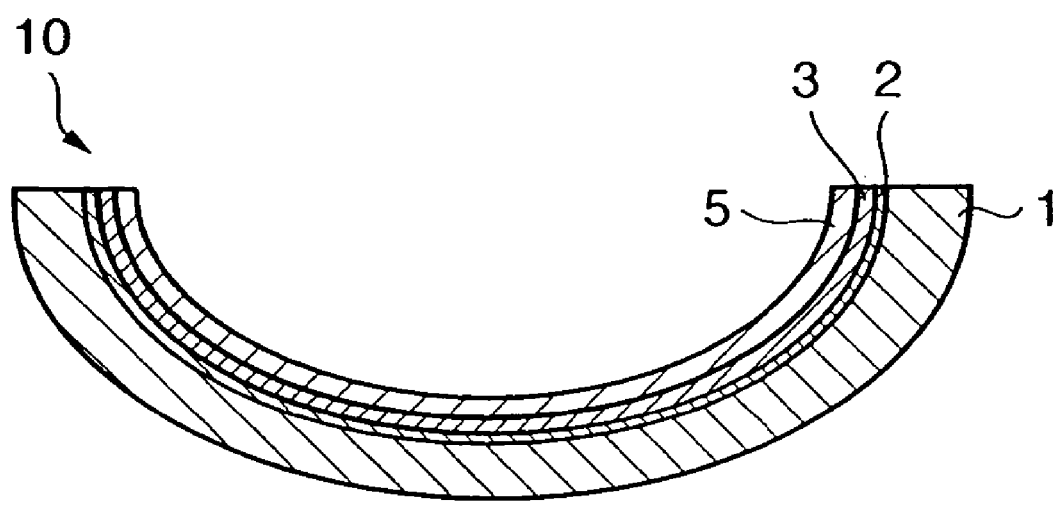
FIG. 10 is a cross-sectional view of a finished formed product which is manufactured by press-forming the plate material shown in FIG. 1 with a die.

FIG. 10 is a sectional view of a finished formed product (reflecting optical element) which is manufactured by press-forming the plate material 10 shown in FIG. 9 with a die. FIG. 10 shows a concave mirror formed as a reflecting optical element.

Figure 11:
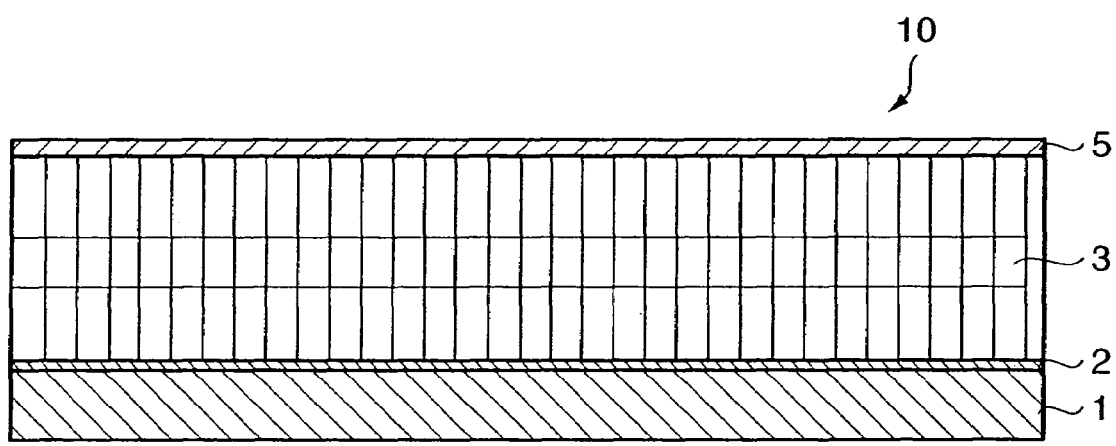
FIG. 11 is a view showing a microstructure in the high-purity metal film of the plate material shown in FIG. 1.

FIG. 11 is a view showing a crystal structure in the high-purity metal film 3 of the plate material 10 shown in FIG. 9. According to this embodiment, as a metal material that forms the high-purity metal film 3, for example, Al (aluminum) having a crystal structure including face-centered cubic lattices is used. This material forms a columnar crystal texture as shown in FIG. 11 by deposition.

Figure 12:
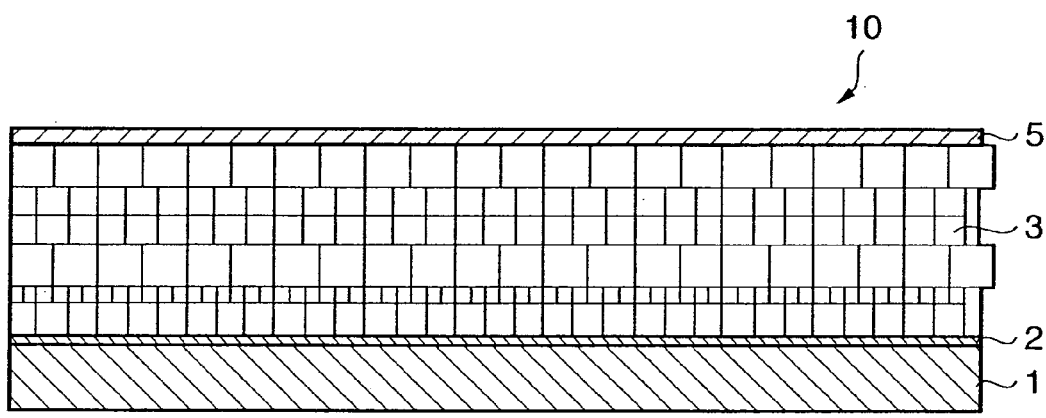
FIG. 12 is a view showing a microstructure in a high-purity metal film 2 which is obtained by press-forming the plate material shown in FIG. 1 with the die.

FIG. 12 is a view showing a crystal structure in the high-purity metal film 3 which is obtained by press-forming the plate material shown in FIG. 9 with the die. According to this embodiment, since deposition is performed at room temperature, the deposited high-purity metal film 3 before forming is comparatively soft just like snow lying on the ground which has not been trampled yet. For this reason, slip, rotation, or the like tends to occur in the crystal structure of the high-purity metal film 3. The high-purity metal film 3 can easily deform to conform to the smooth surface of the die, so that the smoothness on the surface of the die is transcribed very well.

This will be described in more detail with reference to FIGS. 9 to 12.

Conventionally, when a large-size reflecting optical element is to be manufactured by press forming using a rolled plate material, a yield load equivalent to work-hardening during rolling or more must be sufficiently applied to the optical material. Also, the influence caused on the aggregational texture by rolling becomes non-negligible. To form a large-size reflecting optical element having a diameter of 3 mm or more is difficult because the demanded shape precision cannot be obtained. A forming stress exceeding the work-hardening is required. As the optical element becomes large, a large-size processing machine that can obtain a large load becomes necessary. This increases the cost and resource consumption.

In view of this, according to the third embodiment, the high-purity metal film 3 having a texture different from that of the base material 1 is formed on the surface of the base material 1. As a result, even if the surface of the base material 1 is more or less rough, the high-purity metal film 3 which is soft just like snow lying on the ground which has not been trampled yet deforms easily to comply with the smoothness of the surface of the die. Therefore, the surface of the high-purity metal film 3 after forming is not adversely affected by the base material 1 and thus very smooth. According to this embodiment, as the base material 1, a non-rolled plate material, or a plate material which is obtained by annealing a rolled plate material to remove its mechanical anisotropy caused by rolling is used. Thus, the degree of deformation is prevented from being different during forming press forming depending on directions, and the shape precision of the formed product can be improved.

Figure 13:
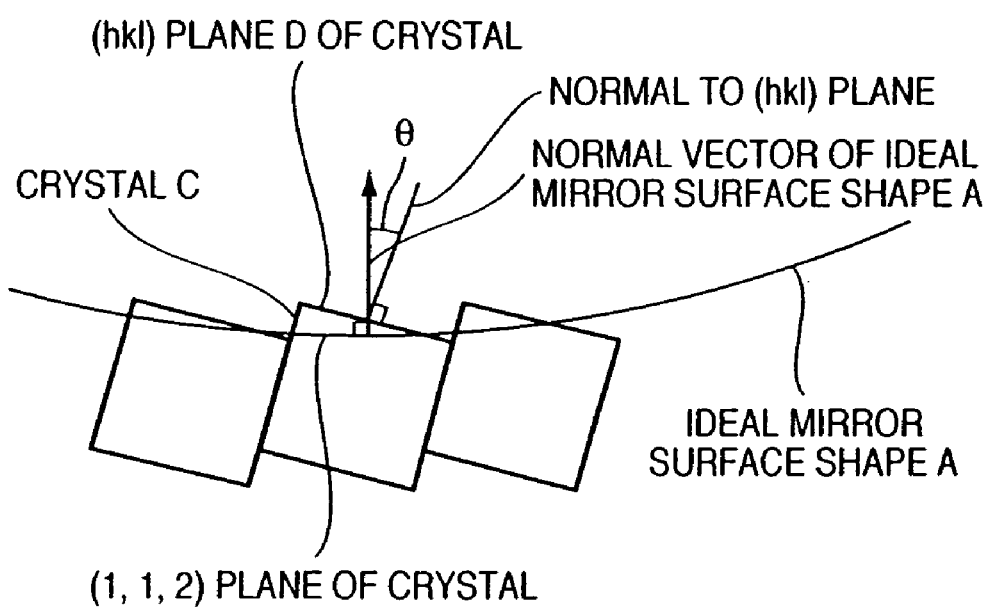
FIG. 13 is a view showing the inclination of the crystal surface with respect to the ideal mirror surface.

According to this embodiment, on the surface of the high-purity metal film 3 after forming, a crystal surface D that forms this surface desirably coincides with the surface of the ideal mirror surface shape as the Miller's ideal shape, which is the target, as much as possible, as shown in FIG. 13, so that a desired smooth surface can be obtained. When the high-purity metal film 3 has a crystal structure including face-centered cubic lattices like aluminum, the (1, 1, 2) plane expressed in Miller indices of the face-centered cubic lattice crystal ultimately coincides with the surface of the ideal mirror surface shape. This is apparent from the experiment of the present applicant. Therefore, ideally, the normal to the crystal surface D which forms the Miller surface of the actual formed product shown in FIG. 5 coincides with the normal to the (1, 1, 2) plane (ideal mirror surface).

An experiment was conducted by the present inventor for confirmation. It was found that a mirror surface having a desired smoothness which is required of a high-precision reflecting optical element can be obtained if an average value θa in the optical effective plane of an angle θ formed by a normal to the crystal surface (the Miller indices of which are defined as (hkl)) D, which forms an actually formed Miller surface and the normal to the (1, 1, 2) plane satisfies the following relation:

$$0.7 \leq \cos \theta a = |(h+k+2l)/\sqrt{\{6\times(h^2+k^2+l^2)\}}| \leq 1 \quad (1)$$

This relation can also be written as:

$$0° \leq \theta a \leq 40° \quad (2)$$

This represents the characteristic feature of the significant texture of the optical element as the formed product obtained by this embodiment. In other words, if the angle formed by the normal to the crystal surface which forms the surface of the finished formed product and the normal to the ideal mirror surface satisfies the above relation, the required surface roughness of the high-precision reflecting optical element can be satisfied. As described above, as the amorphous oxide film 5 is formed on the surface of the high-purity metal film 3, a crystal surface as shown in FIG. 13 does not directly appear on the Miller surface as the formed product. As the amorphous oxide film 5 is very thin, the shape of the crystal surface appears on the surface of the oxide film 5 almost directly.

According to this embodiment, the average crystal grain size of the surface layer (high-purity metal film 3) of the formed reflecting optical element is 0.5 μm or less.

As the average crystal grain size of the high-purity metal film 3 is small in this manner, very fine shearing, slip, or rotation occurs in the columnar crystals that form the high-purity metal film 3. As the metal film 3 has a fine texture, the formed surface becomes very smooth. When a conventional material (rolled material) is processed, a subgrain boundary is present in the crystal, and the crystal grain itself is as large as several ten to several hundred μm and extends in the rolling direction. Such a crystal grain has strong anisotropy in the rolling direction, and a dislocation density in the crystal is high. Consequently, the formed surface cannot become very smooth, and the shape precision of the formed product is degraded.

According to this embodiment, the oxide film on the surface (the surface of the high-purity metal film 3) of the formed reflected optical element has a thickness of 10 nm or less.

The oxide film 5 which is present on the uppermost surface is a thin film with a large band gap. As the thickness of the oxide film 5 increases, the optical aberration is influenced more by light reflected by the surface of the oxide film 5 and light reflected by an underlying metal surface. Also, light to be absorbed by the oxide film increases to influence the reflectance. Accordingly, to have an oxide film with a thickness of 10 nm or less is necessary for the reflecting optical element.

According to this embodiment, the oxide film on the surface (the surface of the high-purity metal film 3) of the formed reflecting optical element is formed of mixed crystals of amorphous and fine crystals.

Being formed of the mixed crystal of amorphous and fine crystals causes corrosion start points to be dispersed finely and evenly, thus preventing local corrosion.

According to this embodiment, as a material which forms the reflecting optical element having the characteristic feature as described above, the plate material 10 is used which includes the high-purity metal film 3 having a texture different from that of the base material 1 and in which an average value θa in the optical effective plane of an angle θ formed by the normal to the crystal surface (the Miller indices of which are defined as (hkl)) D, which forms the surface of the high-purity metal film 3, and the normal to the (1, 1, 2) plane satisfies the following relation:

$$0.55 \leq \cos \theta a = |(h+k+2l)|/\sqrt{\{6 \times (h^2+k^2+l^2)\}}| \leq 1 \quad (3)$$

This relation can also be written as:

$$0° \leq a \leq 57° \quad (4)$$

This means that the surface of the columnar crystal of the high-purity metal film 3 has already been slightly oriented to the ideal mirror surface. When press forming is performed using the plate material 10 as the material, a formed product satisfying the above relations (1) and (2) can finally be obtained.

According to this embodiment, the high-purity metal film 3 has a metal texture including columnar crystals of 50 nm or more which are perpendicular to its surface.

In this texture, dislocation can be sufficiently moved until it piles up when compared to the conventional material subjected to skin-pass drawing. In-grain slip occurs in a preferred shearing direction, as described above, and slip and rotation can occur freely. Thus, a good malleability/rollability can be obtained. Also, the high-purity metal film 3 has an orientation perpendicular to its surface, and a texture which is parallel to the surface of the high-purity metal film 3 is isotropic. Therefore, the shape precision is stabilized, and a desired formed product can be obtained.

According to this embodiment, the high-purity metal film 3 is a high-purity metal thin film made of a single metal having a purity of 98 mol % or more.

From a general formula: τ=Gb/L (where τ: shearing force; G: shear modulus of elasticity; b: shearing displacement; and L: inter-impurity distance), as the purity increases, the forming pressure decreases to facilitate processing.

According to this embodiment, a protective film, a high reflection film, or a composite laminate film of a protective film and high reflection film is formed on the surface of the metal reflecting optical element which is obtained by forming.

Because of this film, the durability against humidity increases greatly, and the high reflection film has a remarkable effect with respect to the very smooth surface.

According to this embodiment, the plate material 10 as the forming material which satisfies relation (3) or (4) is formed by only press forming without using any lubricating material at all to form a formed product that satisfies relation (1) or (2). Thus, a reflecting optical element that can provide a very planarized surface layer having a surface roughness Ra of 10 nm or less and a surface precision (strain: PV) of 5 μm or less can be obtained.

In particular, a pressing die is made of a carbide alloy, tool steel, a ceramic material, or the like, and its surface is covered by a metal oxide, metal carbide, metal nitride, high-density carbon, a precious-metal base film, or a laminate film having a combination of these materials. The composite effect of these materials can contribute to an improvement in shape precision, a decrease in friction, and an improvement in die release.

From this point of view, optimal conditions with which a high-quality reflecting optical element can be obtained at a low cost are studied intensively, and their examples and comparative examples will be described hereinafter. Note that the degree of orientation of the crystal surface of the surface of the reflecting optical element according to this embodiment is examined at each crystal grain on the uppermost surface of deposited aluminum with a backscattering electronic diffraction pattern (EBSP) in an arbitrary view of ×30,000.

Regarding the crystal grain size of the high-purity metal film 3 of the reflecting optical element, its section is observed by a scanning electron microscope (SEM) by vertically and horizontally crossing an arbitrary portion on the observation surface. A vertical size d (average vertical crystal grain size)=L (actual size of vertical line)/n (number of crystal grains on vertical line)/a (magnification) is calculated. A horizontal size d is calculated similarly to calculate an average d={(vertical size d)+(horizontal size d)}/2. Regarding the thickness of the oxide film 5, the section of the reflecting optical element is observed and actually measured by a transmission electron microscope (TEM). A rough estimate value of the thickness of the oxide film 5 can also be obtained on the order of nm by Auger electron spectroscopy (AES). In the texture of the oxide film 5, the presence/absence of a reciprocal lattice point is checked by electron diffraction. If visual observation is difficult to perform, a radial distribution function may be obtained from an electron diffraction chart, and the existence probability may be compared between two atoms. Alternatively, whether a halo or slight diffraction peak is observed is checked by thin-film X-ray diffraction to check the presence/absence of the reciprocal lattice point. To obtain the macroscopic surface roughness, roughness data (Ra) which is obtained by measuring an arbitrary area of about 300 μm square by using New View 100 as a non-contact optical interference measurement device is indicated. As the shape data, the shape precision (PV) of the entire optical effective surface which is measured by using Zygo Mark 4 as a non-contact optical interference measurement device is indicated.

Regarding the columnar crystal texture of the surface of the reflecting optical element material, according to an inexpensive manufacturing method, a high-purity metal material is deposited on a commercially available rolled plate by PVD, CVD, or the like at a temperature of 80° C. or less (preferably room temperature). Then, a large-area material can be obtained at once. In this case, annealing is performed to remove anisotropy of the rolled plate.

According to another means, the material may be obtained by slicing from an ingot obtained by the unidirectional solidifying method. Alternatively, a molten metal may be cast into a plate-shaped mold, and cooled slowly to develop columnar crystals on its surface, thus obtaining the material.

When the optical reflecting element material (plate material 10) formed with the above method is to be formed, none of various types of polishing operations is performed at all as a preprocess. The optical reflecting element material is formed by only forming press forming with a curved surface die having a surface roughness Ra that satisfies Ra≦10 nm, at a forming temperature equal to or less than a recrystallization temperature in an atmosphere, vacuum, or inert environment, without using any lubricant at all. The forming load and forming speed are controlled so that the surface roughness Ra of the reflecting element satisfies Ra≦10 nm and the shape precision PV of the optical effective surface satisfies PV≦5 μm with respect to the shape of the die.

The following examples do not limit the present invention. To change the optical element plate material, materials to form the plate material, means, a manufacturing method, and a formed product by considering the purpose described above is included within the scope of the present invention.

EXAMPLE 1

A granular crystal texture having a film thickness of 2 μm was formed on the surface of a commercially available pure aluminum material, which complied with the JIS standard and was not particularly subjected to skin-pass drawing or the like, in an environment of $2\times10^{-5}$ Torr at room temperature by using aluminum having a purity of 99.99 mol %. This material was not subjected to any one of various types of polishing operations at all as a preprocess. The material was formed by only press forming with a curved surface die having a surface roughness Ra that satisfied Ra≦10 nm, at a forming temperature equal to or less than a recrystallization temperature in an atmosphere, vacuum, or inert environment, without using any lubricant at all, thus obtaining an optical reflecting element. The surface roughness Ra of the reflecting element was 6 nm, and the shape precision PV of the optical effective surface of the reflecting element was 1.1 μm with respect to the shape of the die. From the EBSP result of the reflecting optical element, the (113) plane was oriented in the surface of the reflecting optical element, and accordingly either relation (1) or (2) was satisfied. The crystal grain size in the formed section was 0.30 μm by SEM observation. The thickness of the oxide film was 5 nm by TEM observation. It was confirmed by electron diffraction that the texture of the oxide film included mixed crystals of amorphous and crystals. An $SiO_2$ protective film was formed on the obtained formed product to improve the durability.

EXAMPLE 2

Forming was performed in the same manner as in Example 1 except that a commercially available rolled aluminum plate was annealed and used as the plate material serving as the forming material. As a result, a formed product identical to that of Example 1 was obtained.

EXAMPLE 3

A granular crystal texture having a film thickness of 1.5 μm was formed on the surface of a commercially available ultraplastic aluminum alloy material which was not particularly subjected to skin-pass drawing or the like, in an environment of $2\times10^{-5}$ Torr at room temperature by using silver having a purity of 99.9 mol %. This material was not subjected to any one of various types of polishing operations at all as a preprocess. The material was formed by only press forming with a curved surface die having a surface roughness Ra that satisfied Ra≦10 nm, at a forming temperature equal to or less than a recrystallization temperature in an atmosphere, vacuum, or inert environment, without using any lubricant at all, thus obtaining an optical reflecting element. The surface roughness Ra of the reflecting element was 8 nm, and the shape precision PV of the optical effective surface of the reflecting element was 1.6 μm with respect to the shape of the die. From the EBSP result of the reflecting optical element, as (422) plane was oriented in the surface of the reflecting optical element, and accordingly either relation (1) or (2) was satisfied. The crystal grain size in the formed section was 0.17 μm by SEM observation. The thickness of the oxide film was 4 nm by TEM observation. It was confirmed by electron diffraction that the texture of the oxide film included mixed crystals of amorphous and crystals. An $SiO_2$ protective film was formed on the obtained formed product to improve the durability.

EXAMPLE 4

A granular crystal texture having a film thickness of 2 μm was formed on the surface of a commercially available oxygen-free copper material which was not particularly subjected to skin-pass drawing or the like and complied with the JIS standard, in an environment of $2\times10^{-5}$ Torr at room temperature by using copper having a purity of 99.99 mol %. This material was not subjected to any one of various types of polishing operations at all as a preprocess. The material was formed by only formingpress forming with a curved surface die having a surface roughness Ra that satisfied Ra≦10 nm, at a forming temperature equal to or less than a recrystallization temperature in an atmosphere, vacuum, or inert environment, without using any lubricant at all, thus obtaining an optical reflecting element. The surface roughness Ra of the reflecting element was 5 nm, and the shape precision PV of the optical effective surface of the reflecting element was 0.7 μm with respect to the shape of the die. From the EBSP result of the reflecting optical element, the (331) plane was oriented in the surface of the reflecting optical element, and accordingly either relation (1) or (2) was satisfied. The crystal grain size in the formed section was 0.27 μm by SEM observation. The thickness of the oxide film was 7 nm by TEM observation. It was confirmed by electron diffraction that the texture of the oxide film included mixed crystals of amorphous and crystals. An Al intensified reflecting film and $SiO_2$ protective film were formed on the obtained formed product to improve the infrared reflectance and durability.

COMPARATIVE EXAMPLE 1

Ninety-nine % high-purity aluminum and 95% or less aluminum or aluminum alloy were subjected to hot rolling to form a plywood laminate, and the plywood laminate was further subjected to a gloss process by skin-pass drawing. This material was not subjected to any one of various types of polishing operations as a forming preprocess. This plywood laminate was formed by only press forming with a curved surface die having a surface roughness Ra that satisfied Ra≦10 nm, at a forming temperature equal to or less than the recrystallization temperature in an atmosphere, vacuum, or inert environment, without using any lubricant at all. As a result, the surface roughness Ra of the reflecting optical element was 11 nm, and the shape precision PV of the optical effective surface of the reflecting optical element was 9 μm. The optical effective surface was thus largely distorted. A high-precision reflecting optical element could not be obtained. From the EBSP result of the reflecting optical element, the (220) plane was oriented in the surface of the reflecting optical element, and accordingly neither relation (1) nor (2) was satisfied. The crystal grain size in the formed section was 37 μm by SEM observation. The thickness of the oxide film was 5 nm by TEM observation. From electron diffraction, the texture of the oxide film included complete crystals.

COMPARATIVE EXAMPLE 2

Ninety-nine point eight % high-purity copper rolled plate material was subjected to sufficient cold skin-pass drawing to further decrease its surface roughness. This material was not subjected to any one of various types of polishing operations as a forming preprocess. This rolled plate material was formed by only forming press forming with a curved surface die having a surface roughness Ra that satisfied Ra≦10 nm, at a forming temperature equal to or less than the recrystallization temperature in an atmosphere, vacuum, or inert environment, without using any lubricant at all. As a result, the surface roughness Ra of the reflecting optical element was 16 nm, and the shape precision PV of the optical effective surface of the reflecting optical element was 10 μm. The optical effective surface was thus largely distorted. A high-precision reflecting optical element could not be obtained. From the EBSP result of the reflecting optical element, the (200) plane was oriented in the surface of the reflecting optical element, and accordingly neither relation (1) nor (2) was satisfied. The crystal grain size in the formed section was 28 μm by SEM observation. The thickness of the oxide film was 13 nm by TEM observation. From electron diffraction, the texture of the oxide film included complete crystals.

As has been described above, according to the third embodiment described above, the metal optical element, which is obtained by subjecting the plate material 10 formed of the base material 1 and high-purity metal thin film 3 to a plastic processing, is improved to a level that is not conventionally available from the metallographical viewpoint. As a result, an excellent surface roughness which is not conventionally available can be obtained at a low cost.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application Nos. 2004-118224 filed on Apr. 13, 2004, 2005-069801 filed on Mar. 11, 2005, and 2005-069799 filed on Mar. 11, 2005, which are hereby incorporated by reference herein.

What is claimed is:

1. A reflecting optical element molded from a metal base material with a mold, comprising:
a base material formed of a metal plate material; and
a metal film which is formed on said base material and has a plurality of crystal surfaces,
wherein an average value $\theta a$ in an optical effective surface of said reflecting optical element of an angle $\theta$ formed by (i) a normal to a crystal surface of said metal film and (ii) a normal to a surface as a target shape of said reflecting optical element, which coincides with the normal to the crystal surface, satisfies $$0° \leq \theta a \leq 45°.$$

2. The element according to claim 1, wherein said metal film has an average crystal grain size of not more than 0.5 μm.

3. The element according to claim 1, wherein an oxide film formed on a surface of said metal film has a thickness of not more than 10 nm.

4. The element according to claim 1, wherein an oxide film formed on a surface of said metal film includes mixed crystals of amorphous and fine crystals.

5. The element according to claim 1, wherein said metal film comprises a high purity metal thin film made of a single metal having a purity of not less than 98 mol %.

6. The element according to claim 1, wherein said metal film is formed on a surface of said base material by deposition at room temperature.

7. The element according to claim 1, wherein a surface of said metal film is covered by a protective film, a high reflection film, or a composite laminate film of a protective film and high reflection film.

8. The element according to claim 1, wherein a surface roughness Ra of a surface of said metal film is not more than 10 nm.

9. The element according to claim 1, wherein said base material comprises a plate material from which mechanical anisotropy has been removed.

10. The element according to claim 1, wherein PV≦5 μm is established where PV is a shape error of the reflecting optical element from an ideal shape.

11. The element according to claim 1, wherein said metal film is made of aluminum.

12. The element according to claim 1, wherein the surface of a crystal formed by a surface of said metal film is a (1, 1, 2) plane.

13. The element according to claim 11, wherein a surface roughness Ra of said metal base material satisfies Ra≦3 μm.

14. The element according to claim 11, wherein a maximum length of an impurity which is mixed in said metal base material is not more than 50 μm.

15. The element according to claim 11, wherein the surface roughness of the surface of the element Ra satisfies Ra≦10 nm and the shape precision of the surface of the element PV satisfies PV≦5 μm with respect to the shape of the mold.

16. The element according to claim 11, wherein within a depth range of 2 nm to 60 nm from a surface of said metal film, average Young's modulus E and average hardness Hv of said metal film of respective depths satisfy 65 GPa≦E≦130 GPa and 1.5 GPa≦Hv≦15 GPa, respectively.

17. The element according to claim 11, wherein said metal film has a columnar crystal structure which is perpendicular to a surface of said metal film and has a height of not less than 50 nm.

18. The element according to claim 11, wherein said metal film is made of a metal having a crystal structure including a face centered cubic structure in cold processing.

* * * * *

UNITED STATES PATENT AND TRADEMARK OFFICE
CERTIFICATE OF CORRECTION

PATENT NO. : 7,344,263 B2
APPLICATION NO. : 11/101443
DATED : March 18, 2008
INVENTOR(S) : Keiichi Ishizuka It is certified that error appears in the above-identified patent and that said Letters Patent is hereby corrected as shown below:

ON THE TITLE PAGE:
In the Foreign Patent Documents Item -56-: "JP 08-168897" should read --JP 08-068897--.

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,344,263 B2
APPLICATION NO. : 11/101443
DATED : March 18, 2008
INVENTOR(S) : Keiichi Ishizuka It is certified that error appears in the above-identified patent and that said Letters Patent is hereby corrected as shown below:

ON THE TITLE PAGE
At Item (74), Attorney, Agent or Firm, "Fitzpatrick Cella Harper & Scinto" should read --Fitzpatrick, Cella, Harper & Scinto--.

COLUMN 1
Line 12, "uses a" should read --use--.

COLUMN 4
Line 15, "press formed" should read --press-formed--.

COLUMN 5
Line 64, "tact" should be deleted.

COLUMN 6
Line 40, "descried" should read --described--.

COLUMN 7
Line 48, "is included" should read --are included--.

COLUMN 8
Line 18, "$\tau=\tau 0+\alpha\mu b\sqrt{\tau}$" should read --$\tau=\tau 0+\alpha\mu b\sqrt{\rho}$--.
Line 37, "15 N m$^2$" should read --15 N/m$^2$--.

COLUMN 12
Line 36, "84(C" should read --84°C--.
Line 51, "As described above, according" should read --According--.

COLUMN 17
Line 26, "PV$\leqq$5 μn" should read --PV$\leqq$5 μm--.
Line 51, "(113) plane" should read --(1, 1, 3) plane--.
Line 58, "amorphous and" should read --amorphous and fine--.

UNITED STATES PATENT AND TRADEMARK OFFICE
CERTIFICATE OF CORRECTION

PATENT NO. : 7,344,263 B2
APPLICATION NO. : 11/101443
DATED : March 18, 2008
INVENTOR(S) : Keiichi Ishizuka It is certified that error appears in the above-identified patent and that said Letters Patent is hereby corrected as shown below:

COLUMN 18
Line 19, "(422) plane" should read --(4, 2, 2) plane--.
Line 25, "amorphous and" should read --amorphous and fine--.
Line 38, "formingpress" should read --forming press--.
Line 47, "(331) plane" should read --(3, 3, 1) plane--.
Line 53, "amorphous and" should read --amorphous and fine--.

COLUMN 19
Line 9, "(220) plane" should read --(2, 2, 0) plane--.
Line 34, "(200) plane" should read --(2, 0, 0) plane--.
Line 40, "As has been described above, according" should read --According--.

Signed and Sealed this

Seventeenth Day of February, 2009

JOHN DOLL
*Acting Director of the United States Patent and Trademark Office*